(12) United States Patent
Paulus et al.

(10) Patent No.: US 8,781,930 B2
(45) Date of Patent: Jul. 15, 2014

(54) ENTERPRISE INTEGRITY SIMULATION

(75) Inventors: Sachar M. Paulus, Weinheim (DE); Guido Wagner, Ludwigshafen-Rwchheim (DE); Gunter Bitz, Bruehl (DE)

(73) Assignee: SAP AG, Walldorf (DE)

( * ) Notice: Subject to any disclaimer, the term of this patent is extended or adjusted under 35 U.S.C. 154(b) by 2808 days.

(21) Appl. No.: 11/245,996

(22) Filed: Oct. 7, 2005

(65) Prior Publication Data

US 2007/0100642 A1 May 3, 2007

(51) Int. Cl.
*G06Q 40/00* (2012.01)

(52) U.S. Cl.
USPC .............................................. 705/35; 705/38

(58) Field of Classification Search
USPC ....................................................... 705/35, 38
See application file for complete search history.

(56) References Cited

U.S. PATENT DOCUMENTS

| | | | |
|---|---|---|---|
| 6,976,169 B1 | 12/2005 | Takagi et al. | |
| 7,246,137 B2 | 7/2007 | Paulus et al. | |
| 7,313,618 B2 | 12/2007 | Braemer et al. | |
| 2002/0138416 A1 | 9/2002 | Lovejoy et al. | |
| 2004/0006585 A1 | 1/2004 | Paulus et al. | |
| 2004/0088409 A1 | 5/2004 | Braemer et al. | |
| 2005/0234755 A1 | 10/2005 | Baggett et al. | |
| 2006/0031938 A1 | 2/2006 | Choi | |
| 2006/0136327 A1 | 6/2006 | You | |
| 2007/0016955 A1* | 1/2007 | Goldberg et al. | 726/25 |
| 2007/0100643 A1 | 5/2007 | Paulus et al. | |
| 2008/0082348 A1 | 4/2008 | Paulus et al. | |

OTHER PUBLICATIONS

A Guide for Government Agencies Calculating Return on Security Investment, Version 2.0, Lockstep Consulting. Jun. 13, 2004.*
Berinato, Scott. "Finally, a real return on security spending." CIO. Framingham: Feb. 15, 2002. vol. 15, Iss. 9; p. 43.*
Wei, Huaqiang, Deb Frinke, Olivia Carter, and Chris Ritter. "Cost-Benefit Analysis for Network Intrusion Detection Systems". CSI 28th Annual Computer Security Conference. Oct. 29-31, 2001. Washington D.C.*
Shimonski, Robert J., *Risk Assessment and Threat Identification*; [Online] WindowsSecurity.com; Nov. 25, 2002 [retrieved on Oct. 7, 2005]. Retrieved from the Internet: URL <http://www.windowsecurity.com/articles/Risk_Assessment_and_Threat_Identification.html >. (3 pages).
Information Security Forum, *ROSI, Return on Security Investment, Workshop Report*, Jul. 2005. (44 pages).

(Continued)

*Primary Examiner* — Alexander Kalinowski
*Assistant Examiner* — Abhishek Vyas
(74) *Attorney, Agent, or Firm* — Fish & Richardson P.C.

(57) ABSTRACT

Methods and apparatus, including computer program products, for risk assessment and analysis. Asset data representing a set of assets is received. Threat data representing a set of threats is received. Measures data representing a set of measures is received. A loss expectancy based upon the value of the assets, the potential reduction of value caused by the threats, and the protection of the value caused by the measures is automatically calculated. Project data representing a simulated project is received. A revised loss expectancy is automatically calculated based upon the value of the assets, the potential reduction of value caused by the threats, and the protection of the value caused by the measures as modified by the simulated project. A savings caused by the simulated project is automatically calculated based upon the loss expectancy and revised loss expectancy.

6 Claims, 15 Drawing Sheets

(56) References Cited

OTHER PUBLICATIONS

Bitz, Gunter, *A Return on Security Investment Model for Large Enterprises* (Paper and Slides from Presentation); Presentation delivered at 2005 Information Security Solutions Europe Conference held on Sep. 27-29, 2005 in Budapest, Hungary. (Paper 10 pages; PowerPoint Presentation Slides 27 pages; total 37 pages).

International Preliminary Report on Patentability (1 page); Written Opinion of the International Searching Authority (4 pages); all mailed on Apr. 9, 2008 in PCT International Application No. PCT/IB2006/004124 (Total 5 pages).

United States Patent and Trademark Office Non-Final Office Action and PTO Form 892, Notice of References Cited, issued on May 29, 2008 in U.S. Appl. No. 11/246,559, filed Oct. 7, 2005 and Published as U.S. Patent Publication No. US-2007-0100643-A1 on May 3, 2007 (15 pages).

* cited by examiner

Reporter

Organization  SAP IT TCoE-ENS
Name          Mustermann
User ID
Date
Region        EMEA

300

Knowledge    Status of expertise throughout the organization
Readiness    Defined process owners and sufficient allocation of resources
Penetration  Outreach in the organization

302

Details

Scope: Facilities           Server in data center
       Telecommunication   LAN office & data center
       Server Software     WAN

| ISO 17799 Standard | | Measure | Readiness Knowledge | Readiness | Penetration | Comment |
|---|---|---|---|---|---|---|
| | | | (insert r, y, g, w or b) | | | |
| | | Organisatorial Security | | | | |
| 4.1.2 | 5 | Information security coordination | g | g | y | Security officer structure implemented, to be reviewed after reor |
| 4.1.3 | 66 | Fullfillment of individual responsibility for information security | g | g | y | Tasks and responsibilities are defined |
| 4.1.4 | 296 | Authorization process for information processing facilities | g | g | y | central user management (RADIUS) for network devices |
| 4.2.1 | 6 | Organisational Security of third-party-access | g | y | y | NDA's or contracts may be not yet in place for all cases, but ist |
| 5.1 | 295 | Asset inventory | r | y | y | SISM is the central tool, but the data is still not yet completely fi |
| 8.1.4 | 16 | Segregation of duties | y | y | y | In general this is fulfilled, but due to low resources the tasks are |
| 11.1.1 | 293 | Integration desaster recovery in organisation and processes | y | y | y | There are many preventive measures done on network and dat |
| 11.1.2 | 294 | Business continuity and impact analysis | g | g | g | is our daily work |
| 12.1.5 | 297 | Prevention of misuse of information processing facilities | g | g | g | All ENS Tools/devices are password protected |
| | | Physical and Personal Security | | | | |
| 6.2 | 22 | Information security education and training | g | g | y | In General this is rather good in ENS, but the lack of time preve |
| 6.3 | 298 | Responding to security incidents and malfunctions | g | g | y | Is defined with the IM process and also covered by the 7x24 on |
| 7.2.1, 7.2.3 | 299 | Equipment security | y | y | y | In Datacenters this is well done, in some Office areas in subsidi |
| 7.2.6 | 300 | Re-use and disposal of Equipment | g | g | g | For network devices this is no problem, configuration has to be |
| | | Data and Information Security | | | | |
| 8.1.3 | 52 | Incident managing process | g | g | y | This is redundant to Question 23 ! |
| 8.3 | 304 | Protection against malicious software | g | g | y | IDS coverage not 100% |
| 8.3 | 305 | Virus protection | g | g | y | New technologies for self defending network have to be implem |
| 8.4.1 | 42 | Information Backup | g | g | y | covered by standard data backup for servers/clients, by scripts |
| 8.4.2 | 43 | Operator logs | g | g | y | is done partly (ISS NETSEC logbook, syslog) |
| 8.1.1, 8.6.4 | 40 | Documented operational procedures and responsibilities | g | g | y | Documentation on team share and NWDOKU andd SAPNET |
| 8.5 | 45 | Network management | g | g | y | Several products running: Spectrum, Nethealth, Eye of theStorm |
| 9.3.1 | 307 | Password use | g | g | y | Password Guideline is known, password quality may be not yet |
| 9.2.3 | 33 | User password management | g | g | y | Central Password management (RADIUS), SAP ALL password |
| 9.1.1, 9.6 | 302 | Application access control | g | g | y | In general this is fulfilled, but due to low resources the priviledge |
| 9.4 | 34 | Network access control | g | g | y | For Internet/Extranet/High-secure DMZ's this is already ok, but |
| 9.5 | 301 | Operating system access control | g | g | g | compare Question 33 |
| 9.7 | 303 | Monitoring system access and use | g | g | g | Loglevel adequat |

ENTERPRISE INTEGRITY SIMULATION

BACKGROUND

The present invention relates to a knowledge processing system for risk assessment and analysis.

Risk management is an important consideration for any organization. However, potential risks fall into a very diverse array of categories, including risks relating to information technology (e.g., computer viruses, hackers, etc.), risks relating to physical facilities (e.g., fire, flood, earthquake, burglary, etc.), as well as legal risks (e.g., failure to comply with regulatory requirements). In addition, measures that can be taken to mitigate potential risk can frequently overlap and protect against multiple risks, even across different categories. For example, a security system added to protect a file or web server from physical attacks can protect against hackers gaining physical access to the server, mitigating an information technology risk, as well as protect against burglaries, mitigating a physical facilities risk.

However, different individuals and divisions within an organization are typically responsible for the different risks that the organization faces. For example, the legal division of an organization might be concerned with regulatory risks, while the information technology department is concerned with information technology risks. Ordinarily, information is not readily shared between these divisions, making it difficult to manage the total risk of an organization, as well as determine the most effective projects that can be undertaken to reduce risk across the entire organization.

SUMMARY OF THE INVENTION

In one general aspect, asset data representing a set of assets is received, the asset data includes a respective value for each asset in the set of assets having a value. Threat data representing a set of threats is received; each threat in the set of threats potentially reduces the value of one or more of the assets in the set of assets. Measures data representing a set of measures is received; each measure in the set of measures protects the value of one or more assets from the additional one or more threats of failing to satisfy the one or more requirements. A loss expectancy based upon the value of the assets, the potential reduction of value caused by the threats, and the protection of the value caused by the measures is automatically calculated. Project data representing a simulated project is received, the simulated project modifying one or more assets, threats, or measures. A revised loss expectancy is automatically calculated based upon the value of the assets, the potential reduction of value caused by the threats, and the protection of the value caused by the measures as modified by the simulated project. A savings caused by the simulated project is automatically calculated based upon the loss expectancy and revised loss expectancy.

The invention can be implemented to include one or more of the following advantageous features. A cost of the simulated project may be received. A return on investment based on the savings and the cost may be calculated. A report may be generated, the report including the savings caused by one or more simulated projects and/or the return on investment of one or more simulated projects.

In another general aspect, asset data representing a set of assets is received, the asset data including a respective value for each asset in the set of assets having a value. Threat data representing a set of threats is received; each threat in the set of threats potentially reduces the value of one or more of the assets in the set of assets. Requirements data representing one or more requirements is received, wherein each requirement requires compliance with a regulation and a failure to satisfy the requirement constitutes a threat additional to the set of threats. Measures data representing a set of measures is received; each measure in the set of measures protects the value of one or more assets from the additional one or more threats of failing to satisfy the one or more requirements. A current status is calculated using the measures data and the requirements data based on a level of compliance with the requirements, the level of compliance determined by the measures and the additional one or more threats to one or more assets represented by the measures data and the requirements data.

The invention can be implemented to include one or more of the following advantageous features. Project data representing a proposed project may be received, the proposed project modifying the set of measures by adding additional measures to the set of measures or enhancing one or more measures in the set of measures or both. A return on investment of the proposed project may be calculated based on the modified set of measures and the additional threat. The current status may be represented by a percentage value, with 100 percent representing full compliance with the one or more requirements and 0 percent indicating no compliance with the one or more requirements. The current status may be displayed graphically, wherein the current status is indicated by one of the following colors: red, indicating no compliance or a low level of compliance; yellow, indicating a medium level of compliance; and green, indicating a high level of compliance or full compliance. A report may be generated, the report indicating the level of compliance with the one or more requirements.

In another general aspect, asset data representing a set of assets is received, the asset data includes a respective value for each asset in the set of assets having a value. Threat data representing a set of threats is received; each threat in the set of threats potentially reduces the value of one or more of the assets in the set of assets. Measures data representing a set of measures is received; each measure in the set of measures protects the value of one or more assets from one or more threats. Assessment data representing one or more assessments is received; each assessment rates one or more measures. An implementation level for each measure is calculated based upon the assessment data.

The invention can be implemented to include one or more of the following advantageous features. A potential reduction of risk of one or more assets may be calculated due to the implementation level of each measure. A report may be generated, the report including one or more of the status of each asset or group of assets, the status of each threat or group of threats, the status of each measure or group of measures, or the implementation level for each measure or group of measures, and the report may be displayed to one or more individuals. Each assessment may include three ratings: knowledge, readiness, and penetration. The assessment may be received from e an interview form, the interview form including one or more questions about each measure. The interview form may be completed by an individual with knowledge of one or more measures. The interview form presented to the individual may only includes questions relating to the one or more measures knowledgeable to the individual. The individual may respond to the questions included on the interview form by selecting a color code representing the individual's response. The color code may include the following colors, each color being associated with a numerical rating: red, indicating a low rating of the measure by the individual; yellow, indicating a medium rating of the measure by the individual; green, indicating a high rating of the measure by the individual, white, indicating that the rating of the measure is unknown by the individual, and black, indicating that the measure is not applicable to the individual.

The invention can be implemented to realize one or more of the following advantages. Data relating to security risks and concerns and considerations can be gathered and integrated from a wide array of sources. The individual or individuals responsible for a particular area are automatically informed of risks and concerns that fall within their scope. The workload on any single person to report on security measures is reduced. Reports can be generated that reflect the security and risk situation of an entire organization, including the individual divisions that make up the organization, in addition to reports generated for each individual division. Reports can be generated on a real-time basis, reflecting the most current information available. Predictions and recommendations can be automatically provided based on the information available. The risks and benefits of a potential project can be simulated, and the return on investment for the potential project can be calculated. Potential changes in the physical or regulatory environment can be simulated to determine possible risks, as well as potential measures that can be taken to ameliorate the additional risk. One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

FIGS. 3A and 3B are illustrations of forms used to collect information from a user.

FIGS. 9-13 are computer-generated displays of information providing details of an organization's status to a computer user.

FIG. 14 illustrates a form used to simulate a proposed project.

Like reference numbers and designations in the various drawings indicate like elements.

DETAILED DESCRIPTION

Figure 1:
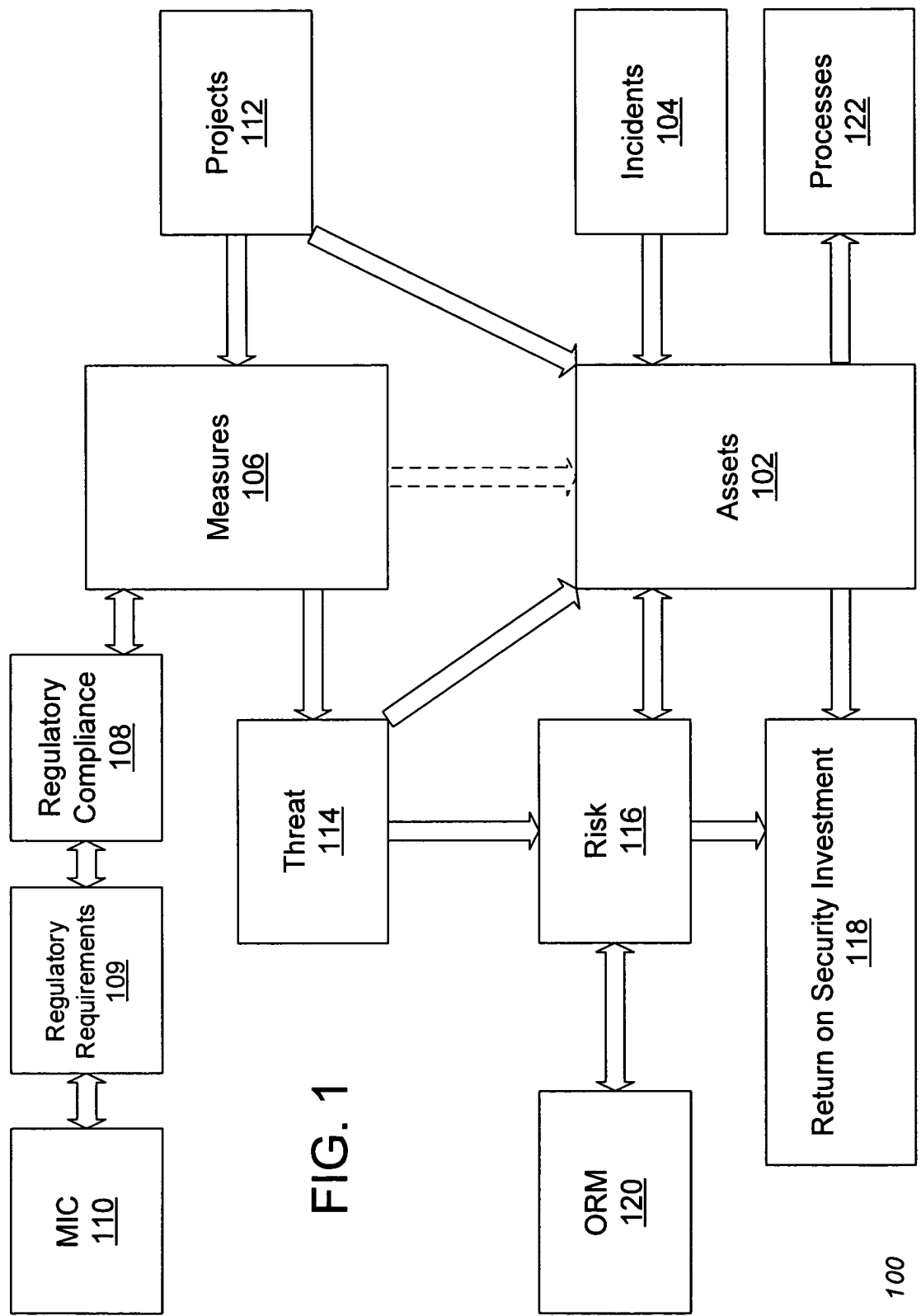
FIG. 1 is a block diagram of a security-related infrastructure.

FIG. 1 illustrates the security-related infrastructure for an organization. The organization has assets 102. Anything that has value to the organization and that requires protection can be an asset. Assets can include tangible and non-tangible items. Examples of possible assets 102 include customer data, a Windows server, facilities/physical plant, employees, shareholder value, and public image. Typically, it is desirable to keep the value of a particular asset as high as possible; alternatively, it is also desirable to keep the total cost of ownership ("TCO") for a particular asset as low as possible. The assets 102 are used by the organization to support the various processes 122 undertaken by the organization in its ordinary course of business.

Security related incidents 104 generally lower the value of one or more assets 102. A single incident can lower the value of a single asset, or multiple assets at the same time. For example, a fire at a warehouse lowers the value of the physical plant, lowers the value of any inventory damaged by the fire, and can even lower the value of employees staffed at the damaged warehouse if the organization is unable to find useful work for these employees. A different kind of incident is a flaw discovered in a product produced by the organization; the product flaw can potentially lower shareholder value as well as the public reputation of the organization. Although many incidents are not scheduled, and happen without warning, incidents can also be anticipated in advance.

In order to protect the value of assets 102, measures 106 can be implemented to protect the value of the assets 102. Examples of measures 106 include virus protections, building access controls, emergency and crisis management plans, business continuity and impact analysis, and segregation of duties. Measures can be implemented for a variety of reasons. Contractual obligations between the organization and third parties might call for particular measures. Various security standards, such as the BS7799/ISO 17799 security standard and the CoBIT security standard specify measures that may have to be implemented. The organization's own policies can dictate other measures. The processes 122 can include the implementation of measures 106.

In addition, regulations 108 set forth various regulatory requirements 109 that impact the measures 106 taken by the organization. For example, the Sarbanes-Oxley Act of 2002 (SOX) of the United States sets forth legal requirements that potentially require that one or more measures 104 be undertaken by the organization in order to comply with the SOX rules and regulations. Similarly, the KonTraG laws of Germany set forth legal requirements that might require other measures in order to comply with the KonTraG regulations. The organization's internal controls 110 help to ensure that measures 106 are implemented to allow the organization to comply with the various regulations 108.

Projects 112 undertaken by the organization can affect the quality and effectiveness of measures 106, as well as assets 102. Projects 112 can include business projects undertaken by the organization; these business projects may not be intended to affect the measures 106, but can often have either a positive or a negative impact on at least one, and typically more than one, measure 106. For example, a business project designed to expand operations to a new country might require additional measures to be put into place in order to comply with local laws. However, this same business project can also have a negative impact on other measures, e.g., if the organization leases a new building that does not have the same level of building access controls as the rest of the organization's facilities. In addition, projects can influence assets; for example, an asset might be shifted to a different location, or the total cost to own an asset increases because of the particular project.

Projects 112 can also include security projects that are specifically designed to have a positive impact on one or more measures 106. For example, a security project to install a fire sprinkler system adds an additional measure to the measures 106 that protect the organization's assets 102—in this case, the sprinkler system helps protect the physical plant from the threat of fire. Threats 114 include any potential incidents that would harm one or more assets 102. As will be described later, each threat can be associated with a single loss expectancy (SLE) factor; the SLE factor is based on both the likelihood of the particular threat, as well as the financial impact of the threat on the assets 102. For example, the likelihood that an employee will fall ill is quite high, but the financial impact of having an employee stay home for a day or two is quite small. On the other hand, the likelihood of an earthquake is very low, but the financial impact of the earthquake would be quite high. In addition, the likelihood of a particular threat can be affected by the geographical location of the assets 102 to which the threat relates. For example, an earthquake in Japan is more likely than an earthquake in Germany.

The likelihood and financial impact of the threats 114 allow a risk 116 to be calculated. The risk 116 is expressed as a currency value, e.g., dollars, euros, yen, etc., and is the mathematically expected cost to the organization of all the threats 110 on the assets 102, based upon the value of the assets 102 and the likelihood of the threats 114 on the assets 102 over a particular time window. In addition, based on the cost of the projects 112 or measures 106 or both, as well as the change of risk 116 that occurs based upon the projects 112 or measures 106, the return on investment of a particular security investment 118 can be calculated. The return on security investment 118 is the ratio of the difference between the original risk without the security investment and the revised risk after the security investment is included, divided by the cost of the security investment, multiplied by 100 to express the return as a percentage. The risk 116 can also be used by an operational risk management (ORM) 120 program to determine the impact of particular threats as well as measures against one or more threats.

The following is an example of the relationship between measures, threats, and assets. An organization monitors computer system access and use; this is a measure taken by the organization. This measure helps mitigate the threats of hacking attacks as well as industrial espionage. Another measure implemented by the organization can be instituting building access control. The building access control helps to reduce the threat of industrial espionage as well as burglary. Finally, the organization can also implement the measure of emergency and crisis management plans. Such plans can mitigate the threats of hacking attacks, industrial espionage, burglary, and natural disasters.

Further, each of these threats has a potential impact on one or more of the organization's assets. For example, a hacking attack could impact a computer server, or result in a breach of the organization's confidential data. Industrial espionage could also have an impact on the computer server or the organization's confidential data. The burglary might have an impact on the computer server, as well as on the server room itself. Finally, a natural disaster might have an impact on the computer server, the server room, and the employees of the organization.

Some measures might be required by various government and industry regulations. For example, both KonTrag and SOX include a requirement that critical organizational data be backed up. The German Data Protection Act (Deutsches Datenschutzgesetz) requires that in addition to data backup, both physical access controls and availability controls be implemented within an organization to protect confidential data.

Further, the measures and assets can all be affected by projects undertaken by the organization. For example, the opening of a new data center, the outsourcing of information technology (IT) services, and identity management all represent projects that could impact the organization's assets, requiring the adjustments of the organization's measures.

In addition, external changes can impact the organization's measures and the threats to the organization's assets. For example, a new threatening technology introduced by a competitor might represent a new threat, to which the organization must adapt. Other external changes might include various political events, such as the introduction of proposed legislation or a change in power after a government election. Physical changes to the environment can also have an impact on the organization; for example, if a new nuclear power plant is constructed near the organization's facilities, the organization may need to adapt its measures in order to deal with the threat that this new power plant might pose.

Figure 2:
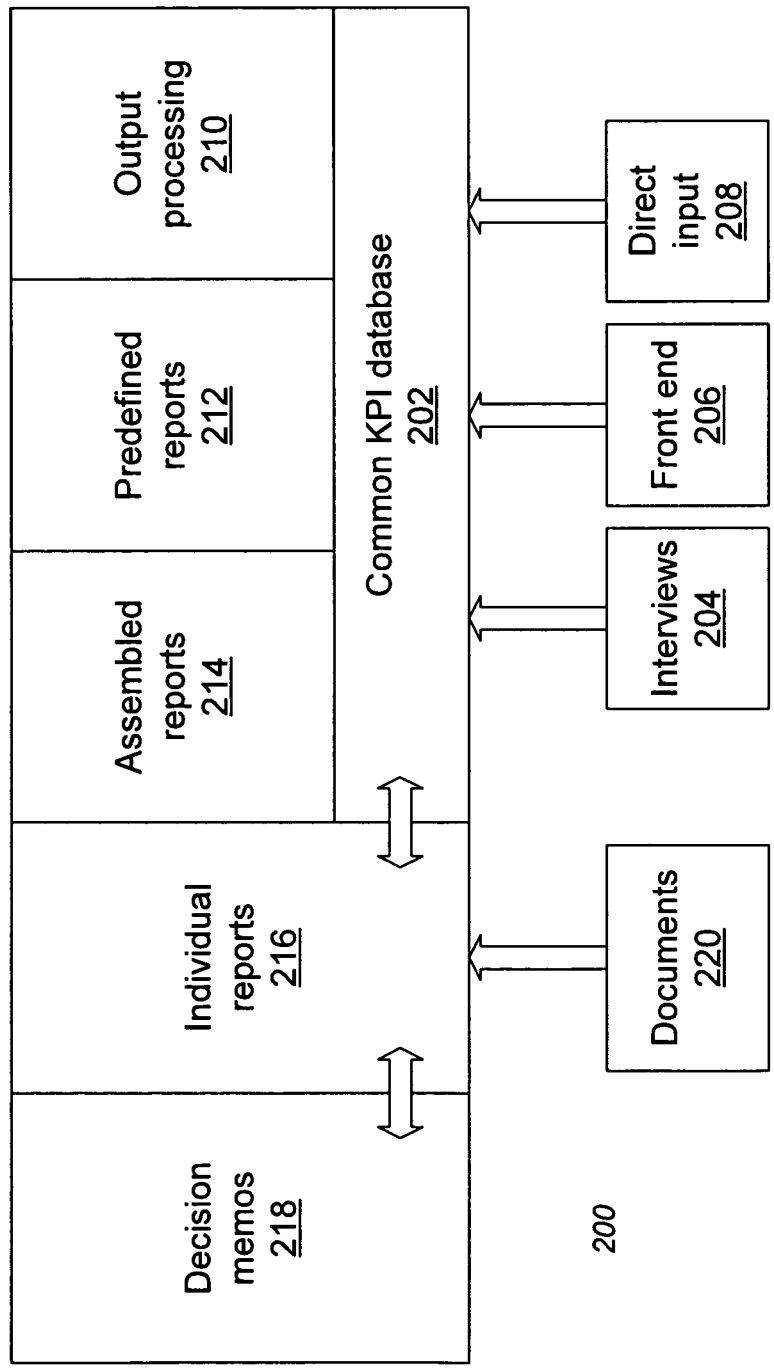
FIG. 2 is a block diagram of an information gathering and reporting system.

FIG. 2 illustrates an information gathering and reporting system 200, that can monitor various measures that have been or may be implemented by the organization, gather information about these various measures, and generate reports concerning the condition of the organization's security system based upon the status of these measures. The reporting system 200 includes a common key performance indicator (KPI) database 202. In one implementation, the three KPI measurements are readiness, penetration, and knowledge.

Knowledge refers to the knowledge required to implement a particular measure. The level of knowledge can be associated with one of three levels. At a lowest level, the organization does not have the expertise required to implement the measure, or there is a major lack of expertise within the organization. At a middle level, expertise is building up within the organization, but it is not yet at a level required to fully implement the measure. At a highest level, there is expertise where needed throughout the organization, and the expertise is such that the measure could be fully implemented. The level of knowledge for a particular measure within the organization can also be unknown.

Readiness refers to the management of the implementation of a particular measure. At a lowest level, there is no defined process owner for the particular measure, or the process is not running at the present time. At a middle level, there is a defined process owner for the particular measure, and the process is being implemented, although the process is not running at its full potential because of insufficient resources or other constraints. At a highest level, there is a defined process owner for the particular measure, there are sufficient resources for the process, and the process is running at its full potential. Alternatively, the level of readiness for a particular measure within the organization can be unknown.

Penetration refers to the implementation status of a particular measure. At a lowest level, the particular measure is not implemented, or implementation has not yet started. At a middle level, the particular measure is partially implemented; the measure has been communicated to the organization, and is being carried out. At a highest level, the particular measure is fully implemented; the measure is working and is being monitored for effectiveness. Alternatively, the level of penetration for a particular measure within the organization can be unknown.

In one implementation, KPI levels are represented visually by the colors red, yellow, and green; the lowest level of a particular KPI is associated with the color red, the middle level of a particular KPI is associated with the color yellow, and the highest level of a particular KPI is associated with the color green. This is known as the "traffic lights" measurement and reporting system.

Information about the various KPIs can be provided to the common KPI database 202 in a variety of ways. For example, interviews 204 can be presented to an individual for completion via a web-based interface or in any other alternative format, allowing individuals within the organization to provide information to the common KPI database 202. Further information about interview formats is provided below. A particular individual within the organization will not know everything about the organization, but is likely to know quite a bit about his or her area of specialization within the organization. By combining the information gathered from multiple interviews 204, the common KPI database 202 grows in comprehensiveness and accuracy. Information about the various KPIs can also be gathered through a front end 206 of the reporting system 200, or by a direct input 208 mechanism to the reporting system 200, e.g., input provided in the form of data files from other software applications. For example, individual incidents can be reported to the reporting system 200 by individuals using the front end 206, or by direct input from a separate incident reporting system.

In some implementations, each source of information can be assigned its own weighting. For example, an interview completed by the chief security officer can be given a larger weight as compared to an interview completed by a low-level employee such as a security guard, which would represent the assumption that the chief security officer is a more reliable source of information than a security guard.

Output processing 210 of the information gathered in the common KPI database 202 allows for the generation of both predefined reports 212 as well as assembled reports 214. Assembled reports 214 are custom reports reflecting specific information requested by one or more individuals. In addition, individual reports 216 can be generated for particular individuals based upon their needs. For example, a chief executive officer of the organization might want to have information about a first set of security issues; a chief security officer will likely want to have information about a broader set of security issues; and the board of directors will likely want a broad overview of the security of the organization. In addition, decision memos 218 can be prepared to provide specific information for particular individuals, and be limited in scope to only include information that is applicable in order for an individual to make an informed decision.

FIG. 3A shows an example of an interview form 300 that can be used to collect information about the KPIs from an individual. For example, this interview form can be web-based or can be completed on paper or as an electronic file for later input into the reporting system. Information 302 about the individual completing the interview form 300 can be collected. The interview form 300 can be customized for a particular individual, based upon the position of the individual within the organization. For example, a security guard can be asked questions about measures that protect physical assets, e.g., door locks, visitor registration procedures, etc., while a system administrator can be asked questions about measures that protect various computer systems and the data that these computer systems contain. Further, the interview form 300 can be further customized based upon the region where the individual is located; different measures might be in place for Europe than for North America.

The interview form 300 lists a variety of measures 304. Based upon the individual's knowledge of each of the measures, the individual can score each measure based on the three KPIs of knowledge 306, readiness 308, and penetration 310. In one implementation, the individual can score each measure based upon the three level traffic light color-coded system described above; all the individual needs to do for each KPI for each measure is select the appropriate color code that corresponds to the individual's assessment of each measure. If the individual has no knowledge about a particular measure (e.g., it is outside the scope of the individual's position), or the individual does not know the status of a particular measure, other color codes, such as white or black, can be used by the individual to indicate the lack of knowledge about a particular measure, or that the status of the particular measure is unknown. The individual also has the option of providing further written comments 312 regarding to the status of each measure that can be reviewed by other individuals within the organization.

Figure 3B:
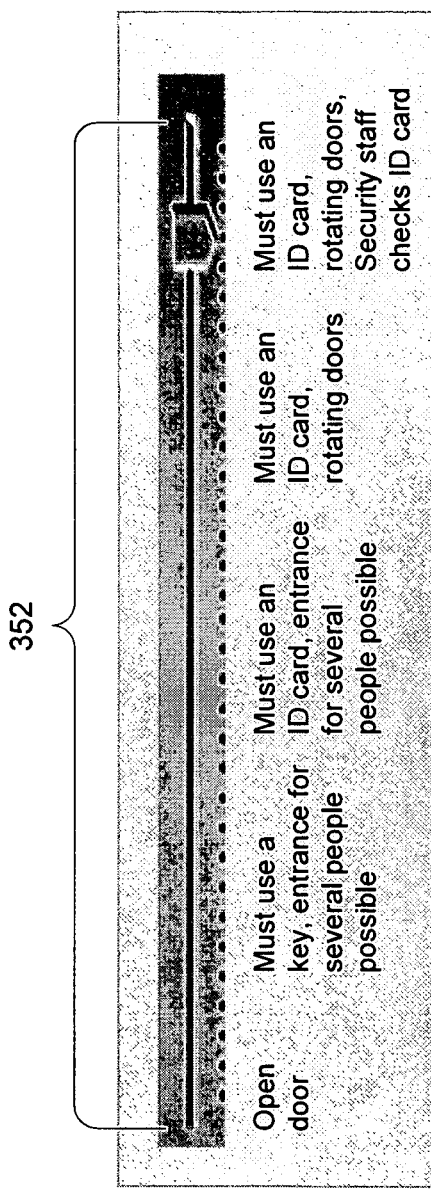

In another implementation, an individual can be presented with a scale for each metric, allowing the individual to indicate the status of a particular measure on a sliding scale. FIG. 3B shows an example of an interview form 350 that can be used to collect information about the KPIs from an individual. Slider 352 can be adjusted by the individual to reflect the status of the measure. For example, at one extreme, no building access controls are installed, and anyone can enter or leave a building unrestricted. At the other extreme, each individual must use an ID card to operate a rotating door, as well as present the ID card to a security officer. Each individual can set the slider at the point which represents the actual status of the measure. As above, additional selections can be provided to the individual to indicate a lack of knowledge about a particular measure, or that the status of the particular measure is unknown.

The information gathered can be used to generate summaries relating to the status of individual measures, as well as the status of individual assets. In one implementation, the summary status can be reported using the traffic light system described above. Each of the KPIs measured, knowledge, readiness, and penetration, are combined into a single implementation level for each measure. The implementation levels of multiple measures within a single country can be combined to create an implementation level of all the measures in a single country; similarly, the implementation levels of multiple measures within a single divisions can be combined to create an implementation level of all the measures of a single division. The implementation levels of all the measures for multiple country or multiple division can be further combined to create an implementation level of all the measures for a region, a world wide status, or an entire organization, as desired. In each of these consolidation steps, the weighting of each individual implementation level for a measure is based on the value of the assets that are protected by the measure.

Figure 4:
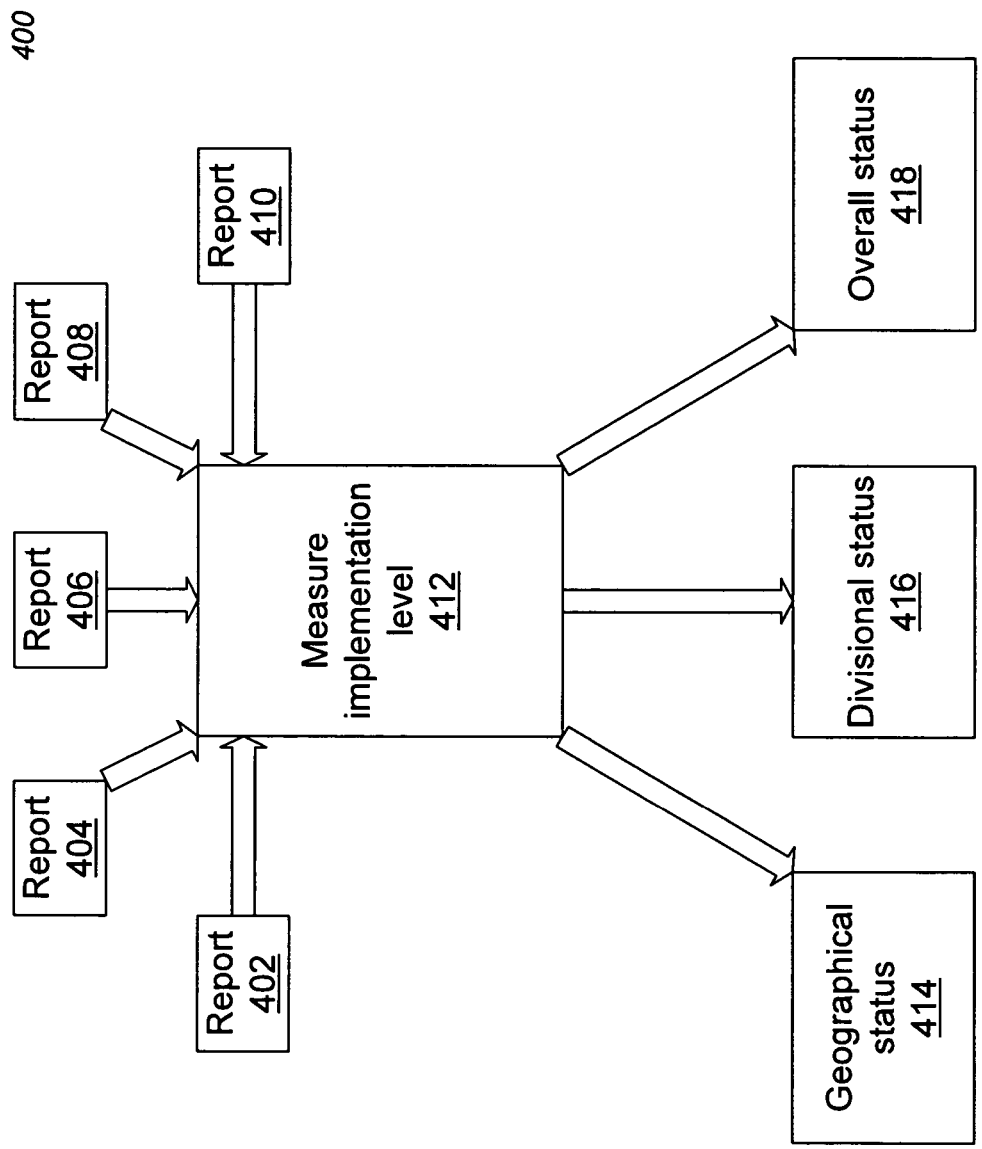
FIG. 4 illustrates the consolidation of statuses for a single measure.

FIG. 4 illustrates the consolidation of traffic light status for a single measure. As described above, a variety of information submissions 402, 404, 406, 408, 410 are collected regarding a particular measure. These information submissions 402, 404, 406, 408, 410 are combined into a measure implementation level 412 that contains information from all of the data sources and information submissions 402, 404, 406, 408, 410. A geographical status 414 can be generated by applying a weighting algorithm to the measure implementation level 412. For example, if the status of a particular measure is desired for North America, any information in the measure implementation level 412 can be ignored unless it is associated with Canada, the United States, and Mexico. Further, if desired, different weighting factors can be applied to information associated with Canada, the United States, and Mexico; for example, based upon the organization's presence in each of these three countries. In one implementation, the geographical status 414 can be expressed using the red/yellow/green traffic light system.

Similarly, a divisional status 416 can also be generated by applying a weighting algorithm to the measure implementation level 412. For example, if the status of a particular measure is desired for the human resources division, any information in the measure implementation level 412 can be ignored unless it is associated with the human resources division. Further, if desired, different weighting factors can be applied to information associated with the human resources division; for example, different weights can be applied to information that comes from payroll, benefits and the human resources IT department. In one implementation, the divisional status 416 can be expressed using the red/yellow/green traffic light system; red applying to a divisional status below a certain threshold; green applying to a divisional status above a second threshold; and yellow applying to a divisional status falling between the two thresholds.

An overall status 418 can also be generated based upon the measure implementation level 412. The overall status 418 provides a summary status of the individual measure for the entire organization. In one implementation, the overall status 418 can be expressed using the red/yellow/green traffic light system.

Figure 5:
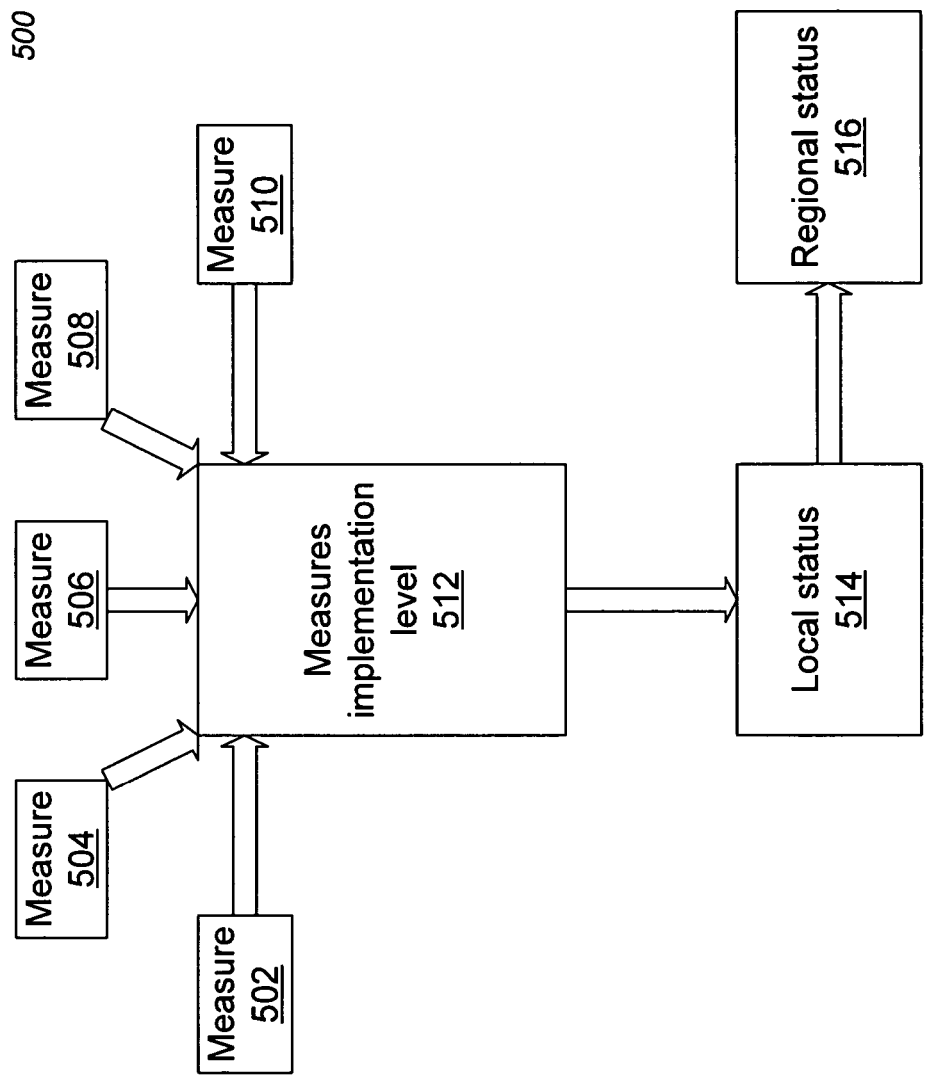
FIG. 5 illustrates the consolidation of statuses for a single asset.

FIG. 5 illustrates the consolidation of traffic light status for a single asset. The status of each measure relating to the asset 502, 504, 506, 508, 510 is collected and combined into a measures implementation level 512 that contains information about all of the measures relating to the asset. A local status 514 can be generated by applying a weighting algorithm to the measures implementation level 512 in combination with the value of the protected asset. For example, if the status of a particular asset is desired for the United States, the measures implementation level 512 is combined with the value of the asset in order to determine the impact of the measures upon the asset. In one implementation, the local status 514 can be expressed using the red/yellow/green traffic light system. Based upon the protection requirement of the asset in each of the countries within a region, a regional status 516 can be calculated. In one implementation, the regional status 516 can be expressed using the red/yellow/green traffic light system.

The red/yellow/green traffic light system is a user-friendly method of collecting and displaying data relating to the organization's security system; however, in order make use of data collected under the traffic light system, the data must be converted into numerical values. These numerical values can then be stored as status measures, $K_{Type}$, for each of the KPI types, knowledge, readiness, and preparation. In addition, a weighting $Kw_{Type}$ can be applied to each of these types of KPI, depending on the needs and assessments of the organization.

In one implementation, a status measure can range from 0 to 32. If the status measure is less than or equal to 10, the status measure is considered to be red; if the status measure is greater than 10, but less than or equal to 24, the status measure is considered to be yellow, and if the status measures is greater than 24, the status measure is considered to be green. For example, if $K_{Knowledge}$ is equal to 20, the color associated with the knowledge KPI is yellow; if $K_{Penetration}$ is 26, the color associated with the penetration KPI is green.

Further, in this implementation, for data that is collected using the red/yellow/green traffic light system, for example by interview, red attributes are treated as having a status measure of 4, yellow attributes are treated as having a status measure of 16, and green attributes are treated as having a status measure of 32. If a status measure is used to collect this data, the scale is divided into 33 sections, from 0 to 32, and the section of the scale that the individual has selected is used as the status measure for the KPI under consideration. Using this method to translate between traffic light colors and numerical values, a variety of calculations can be used to determine the costs, savings, and return on investments for a particular security project.

The status measure of each KPI can be used to evaluate measures that are implemented poorly. For example, if the status measure of $K_{Knowledge}$ is low, then the organization must gain knowledge about that particular measure. If the status measure of $K_{Knowledge}$ is high, but $K_{Readiness}$ is low, than the organization has the knowledge to implement the measure under consideration, but is not well prepared to do so. If the status measure of $K_{Knowledge}$ and $K_{Knowledge}$ are high, but $K_{Penetration}$ is low, the organization has the knowledge to implement the measure under consideration, and is prepared to do so, but the organization hasn't made a significant effort to actually implement the measure.

Figure 6:
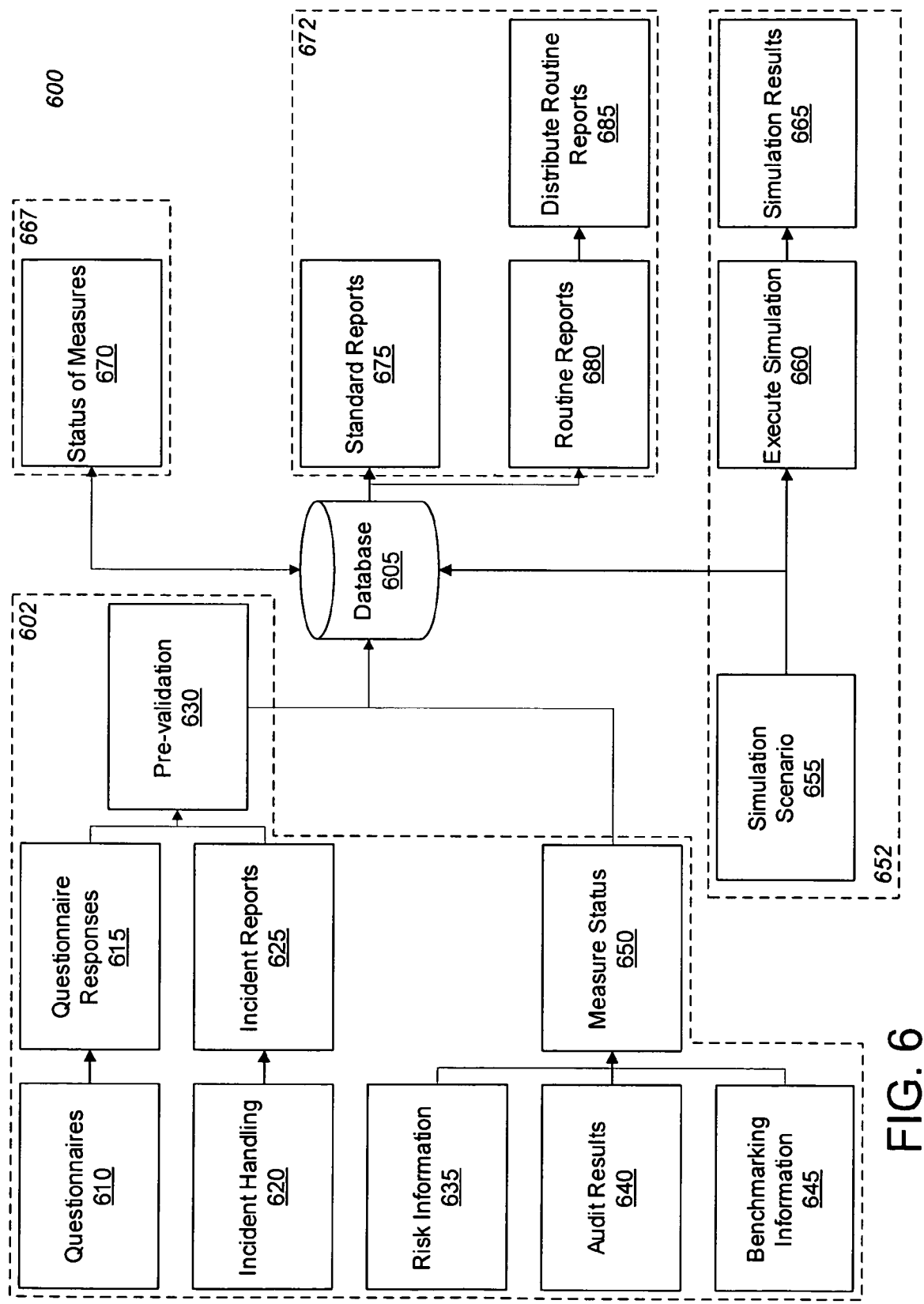
FIG. 6 is a block diagram of a system for combining and distributing information relating to the risk status of an organization.

FIG. 6 illustrates a system 600 for combining and distributing information relating to the risk status of an organization. All of the information is gathered and stored in a database 605 for use in the reporting, simulation, and validation process. A data collection process 602 collects information through a variety of mechanisms. Questionnaires regarding various measures can be created and distributed 610 to various individuals within the organization. The completed questionnaire responses 615 can then be collected. In addition, an incident handling mechanism 620 can be implemented to provide fraud and security incident reports 625; the incident reports 625 are also collected. Together, the questionnaire responses 615 and incident reports 625 are pre-validated 630 and stored in the database 605. As an example of pre-validation, if for a single measure, an individual reported the status of the knowledge KPI as red, but the penetration of the KPI as green, this would fail a pre-validation test, as it is impossible to be fully implementing a measure that nothing is known about. Similarly, the questionnaire responses 615 and incident reports 625 can be pre-validated to determine if there are an excess of green indicators or red indicators, which could indicate a bias by the individual completing the questionnaire response or a problem with the incident reporting system. Questionnaire responses or incident reports that fail the pre-validation step can be flagged for further review and/or excluded from the database 605. Risk information 635, audit results 640, and benchmarking information 645 can be used to generate a measure status 650, which is also stored in the database 605.

A simulation process 652 allows simulations to be performed based upon the data collected during the data collection process 602. First, simulation scenarios 655 are defined. Simulation scenarios can be created for, among other things, potential security projects, potential business projects, or potential changes in the environment. A simulation of a scenario can determine the influence of the project or environmental change on the status of controls, and on the value of assets. Upon the selection of a simulation scenario 655, the system 600 uses the information in the database 605 and executes the simulation 660. During the execution of the simulation 660, the new security status of assets and controls, based on the project or environmental change, is calculated and then used to determine the return on security investment as well as a residual risk. These results can then be compared with the current security status of assets and controls. After the simulation has been executed, the simulation results 665 are distributed or otherwise made available to the appropriate individuals within the organization. Further details relating to the techniques used during the simulation process 652 are discussed below.

A validation process 667 can be used to validate the status of measures 670 based on information in the database 605. As an example, the Chief Security Officer (CSO) of the organization can verify that the various reports indicating that building access controls are functioning are valid and accurate; if these reports are not accurate, the CSO can make adjustments to information contained in the database 605. The information can be presented in a summarized fashion; for example, the summarized status of assets that were impacted by incidents and the current status of controls can be reported, based upon information received from audits, risk management reports, benchmarking, and reported data. Based upon these summary reports, validation decisions and adjustments to the status of particular measures can be made by the appropriate individuals, and these adjustments are then stored in the database 605.

Finally, a reporting process 672 can generate both standard and non-standard reports to various individuals. Standard reports 675 are generated, and available to the appropriate individuals within the organization. In one implementation, the standard reports 675 are available as static or dynamic web documents from a web server to appropriate individuals using conventional web browsers over secure network connections. In addition to the standard reports 675, which are always available and accessible in real-time, routine reports 680 can also be generated. Routine reports 680 are defined by individuals in the organization to contain information pertinent to a specific individual or division. For example, a routine report for the legal department can include information pertaining to regulatory requirements and risks, while a routine report to the information technology department can include information pertaining to information technology threats and risks. Based on the nature of the routine report 680, the routine report is distributed 685 or made available to the appropriate individuals or divisions.

A single loss expectancy $SLE_{T,A,C}$ for a particular asset A in country C to a threat T can be calculated using the formula $SLE_{T,A,C} = ROC_{T,A} * I_{T,A} * EX_{T,A,C} * V_A * Pr_{A,C}$, where $Roc_{T,A}$ is the annual rate of occurrence of an incident damaging asset A caused by threat T; $I_{T,A}$ is an impact factor for an asset A to a threat T; $EX_{T,A,C}$ is the exposure of asset A in country C to a threat T in comparison to the standard exposure Ex; $V_A$ is the value of the asset A expressed in dollars, euros, or other currency unit; and $Pr_{A,C}$ is the presence of the asset A in country C expressed as a percentage of the total asset A. The impact factor is defined as the portion of the asset A that is damaged due to the occurrence of a particular threat T, with $I_{T,A}=0$ representing no damage from the threat T to the asset A and $I_{T,A}=1$ representing total loss of the asset A from the threat T; each asset-threat pair can be assigned a different impact factor. The standard exposure value is Ex=1, which represents the lowest possible risk; the exposure $EX_{T,A,C}$ for a particular asset A in country C to a threat T can range from 1, equivalent to the standard exposure and representing the lowest possible risk, to infinity, representing total exposure of an asset in a country to a risk. The exposure value can also be called a risk factor multiplier.

The effectiveness of one measure on a threat can be expressed as $Eff_{T,M,C}$, where $Eff_{T,M,C}=(1-Raro_{T,M}*IL_{M,C})(1-RI_{T,M}*IL_{M,C})$ $Raro_{T,M}$ is the reduction of annual rate occurence for a threat T due to a measure M, and ranges from 0 to 1, where a value of $Raro_{T,M}=0$ represents a completely ineffective measure M against the threat T and a value of $Raro_{T,M}=1$ represents a measure M that can completely prevent an incident due to threat T. $IL_{M,C}$ is the implementation level for a particular measure M against a threat T, and also ranges from 0 to 1, where $IL_{M,C}=0$ indicates a measure M that is not at all implemented against a threat T and $IL_{M,C}=1$ indicates a measure M that is fully implemented against a threat T. $RI_{T,M}$ is the reduction of the impact rate for a measure M against a threat T, and also ranges from 0 to 1, where $RI_{T,M}=0$ represents a completely ineffective measure M against a threat T, and $RI_{T,M}=1$ represents a measure M that will completely eliminate the damage of an incident caused by threat T.

The annual loss expectancy $ALE_{A,C}$ for a particular asset A in country C is calculated by the formula $$ALE_{A,C} = \sum_T SLE_{T,A,C},$$

where $SLE_{T,A,C}$ is calculated as shown above. The mitigated annual loss expectancy $mALE_{A,C}$ for a particular asset A in country C is calculated by the formula $$mALE_{A,C} = \sum_T \left( SLE_{T,A,C} * \prod_M Eff_{T,M,C} \right),$$

where both $SLE_{T,A,C}$ and $Eff_{T,M,C}$ are calculated as shown above. Once $ALE_{A,C}$ and $mALE_{A,C}$ are calculated, the savings $S_{A,C}$ for a particular asset A in country C due to all measures M can be calculated as $S_{A,C}=ALE_{A,C}-mALE_{A,C}$. The total cost of measures $TCO_{A,C}$ for all measures M relevant to an asset A is calculated as $$TCO_{A,C} = \sum_M Cost_{M,A,C},$$

where $Cost_{M,A,C}$ is the cost of a particular measure M to protect an asset A in country C.

The return on security investment $ROSI_{A,C}$ for an asset A in country C is $ROSI_{A,C}=S_{A,C}-TCO_{A,C}$ which can also be expressed as $ROSI_{A,C}=ALE_{A,C}-mALE_{A,C}-TCO_{A,C}$ Expressed as a percentage, the return on investment ("ROI") can be calculated using the formula $$ROI = \left( \frac{ROSI_{A,C}}{TCO} - 1 \right) * 100.$$

These calculations can also be used to determine the effectiveness of simulated measures, in order to determine whether or not it is worthwhile to implement a new measure Mnew. The mitigated annual loss expectancy for all existing measures in place, $mALE_1$, is calculated as $$mALE_1 = \sum_A \sum_C mALE_{A,C}.$$

The mitigated annual loss expectancy for all existing measures in place plus one new measure Mnew being simulated, $mALE_2$, is calculated as $$mALE_2 = \sum_A \sum_C mALE_{A,C}.$$

The total cost of ownership ("TCO"), for the new measure being simulated, Mnew, is equal to the cost of the new measure, $C_{Mnew}$. The savings $S_{Mnew}$ resulting from the new measure Mnew can be simulated using the formula $S_{New}=mALE_1-mALE_2$; the return on security investment for the new measure Mnew can be simulated using the formula $ROSI_{Mnew}=S_{New}-TCO$; this formula can also be expressed as $\text{ROSI}_{Mnew} = \text{mALE}_1 - \text{mALE}_2 - C_{Mnew}$. Therefore, the return on investment for this new measure Mnew being simulated can be calculated by the formula $$ROI = \left(\frac{ROSI_{Mnew}}{C_{Mnew}} - 1\right) * 100.$$

The implementation level, $IL_{M,Rep(C,D)}$, for a particular measure M in a single report Rep(C, D) covering a single county C and a single division D can be expressed as $$IL_{M,Rep(C,D)} = \frac{\sum (Kw_{Type} \times K_{Type,M,Rep(C,D)})}{\sum Kw_{Type}}.$$

As described above, $Kw_{Type}$ is a weighting value for each type of KPI, and $K_{Type,M,Rep(C,D)}$ is the KPI value for each type of KPI for a measure M and Report Rep(C, D) covering a single country C and a single division D. The implementation level, $IL_{M,C}$, for a particular measure M in a single country C, but across several divisions can be expressed as $$IL_{M,C} = \frac{\sum (IL_{M,Rep(C,D)} \times Dw_D)}{\sum Dw_D}.$$

$Dw_D$ is a weighting factor Dw for division D.

The relevance $R_M$ of a measure M can be calculated as $$R_M = \frac{\sum_{A,C} (Ex_{A,C} \times Wsec_{A,M} \times Mw_M)}{\sum_{A,C} Ex_{A,C} \times \sum_A Wsec_{A,M}}.$$

$Mw_M$ is a measure weighting value Mw for a measure M. $Ex_{A,C}$ is the exposure of asset A in country C to all threats; $Ex_{A,C}$ is expressed in relation to a standard exposure value, Ex, as described above. In addition, the exposure of an asset A to all threats in all countries, $Ex_A$, can be calculated as $$Ex_A = \frac{\sum_C (Ex_{A,C} \times R_C)}{\sum_C R_C}.$$

The implementation level $IL_M$ of one measure M across all countries can be calculated as $$IL_M = \frac{\sum_C (IL_{M,C} \times R_{M,C})}{\sum_C R_{M,C}}.$$

Similarly, the implementation level $IL_C$ of all measures in a single country C can be calculated as $$IL_C = \frac{\sum_M (IL_{M,C} \times R_{M,C})}{\sum_M R_{M,C}}.$$

From either of these calculations, the implementation level IL of all measures across all countries can be calculated as either $$IL = \frac{\sum_M (IL_M \times R_M)}{\sum R_M} \text{ or } IL = \frac{\sum_C (IL_C \times R_C)}{\sum R_C}.$$

Error calculations can also be performed in order to determine the accuracy of the information generated by the above formulae. The average implementation level for a measure, $\overline{IL}$, can be calculated as $$\overline{IL} = \frac{\sum_{i=1}^{n} IL_i}{n}.$$

Similarly, the absolute range of implementation levels, $\Delta \overline{IL}$, can be calculated as $$\Delta \overline{IL} = \frac{((\overline{IL} - IL_{min}) + (IL_{max} - \overline{IL}))}{2}.$$

As $z = f(x_1, \ldots, x_n)$ is known, $$\Delta z = \left|\frac{\partial f}{\partial x_1}\right| \Delta x_1 + \ldots + \left|\frac{\partial f}{\partial x_n}\right| \Delta x_n.$$

From this, the absolute range of the return on security investment $ROSI_{A,C}$ for an asset A in country C can be derived as $$\Delta ROSI_{A,C} =$$
$$\Delta \overline{IL} * \sum_M \sum_T Roc * I * Ex * V * (Raro * (1 - RI * \overline{IL}) + RI * (1 - Raro * \overline{IL})).$$

Similar calculations can be applied to determine the security status of a particular asset, as well as a group of assets; remaining security risks for a single asset or a group of assets; the security status of business processes; and the security status of an entire organization or particular divisions within the organization. In addition, further calculations can be undertaken to simulate the impact of a project on all of these measures, as well as to simulate the impact of changes in the environment to all of these measures.

Figure 7:
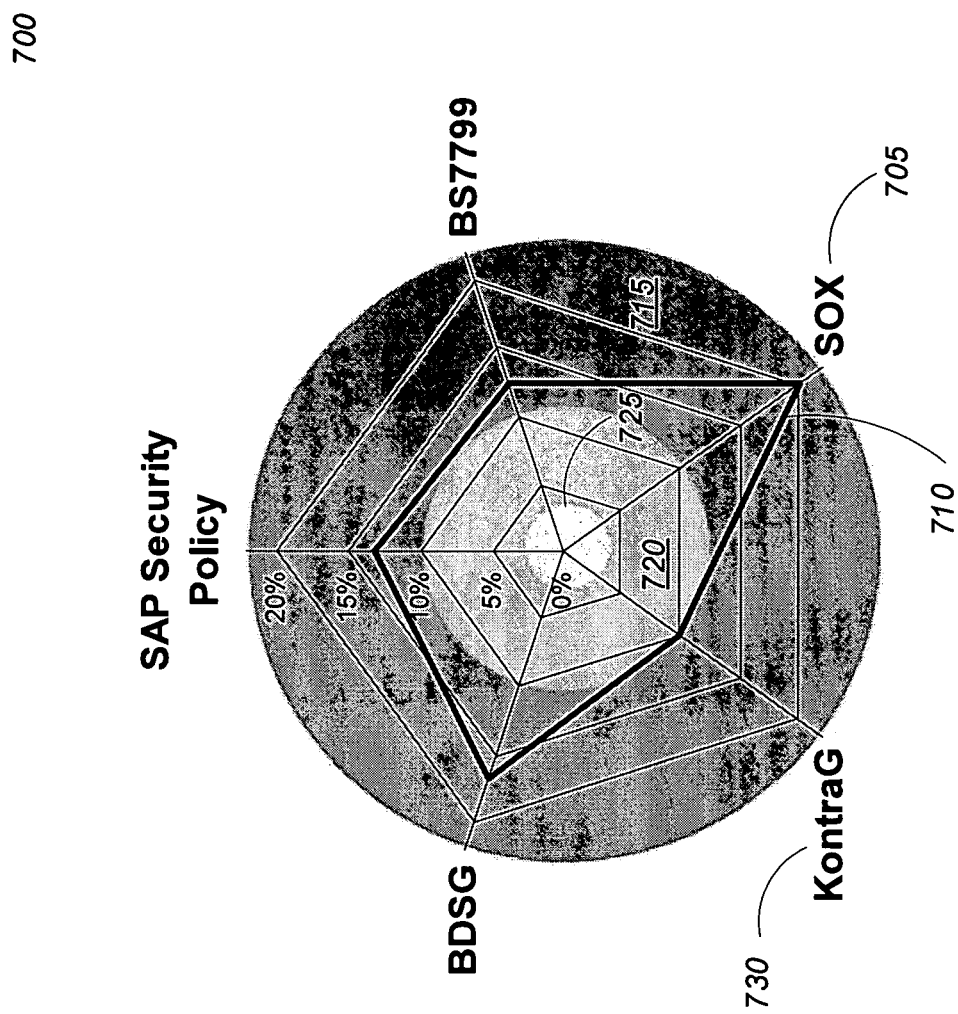
FIGS. 7 and 8 illustrate computer-generated displays of information relating to the implementation of security measures.

FIG. 7 illustrates a first method of displaying to a computer user the status of implementation of security measures related to regulatory requirements. Each regulatory requirement is represented as a spoke. For example, the regulatory requirements of SOX are represented by spoke 705. The heavy line 710 provides a visual representation of the percentage of measures related to regulatory requirements that are not likely to have been sufficiently implemented. The percentage of measures related to regulatory requirements that are not likely to have been sufficiently implemented is determined based upon the input received by the reporting system, e.g., by interviews of various individuals within the organization. In the example presented in FIG. 7, approximately 21 percent of the measures relating to SOX are not likely to have been sufficiently implemented.

FIG. 7 also illustrates how the traffic light system can be used to provide guidance to an organization. The outer ring 715 represents the red zone, the middle ring 720 represents the yellow zone, and the inner ring 725 represents the green zone. The spoke 705 representing the regulatory requirements of SOX shows that the organization is in the red zone, indicating that the organization has additional work to perform in order to implement measures bringing it into compliance with the SOX regulations. The spoke 730 representing the regulatory requirements of KonTraG shows that the organization is in the yellow zone, indicating that the organization is making decent progress in implementing measures bringing it into compliance with the KonTraG regulations, but still has additional measures that need to be fully implemented. The ultimate goal for the organization is to have all of its requirements fall within the green zone, indicating that only a minimal number of measures are not yet sufficiently implemented.

Figure 8:
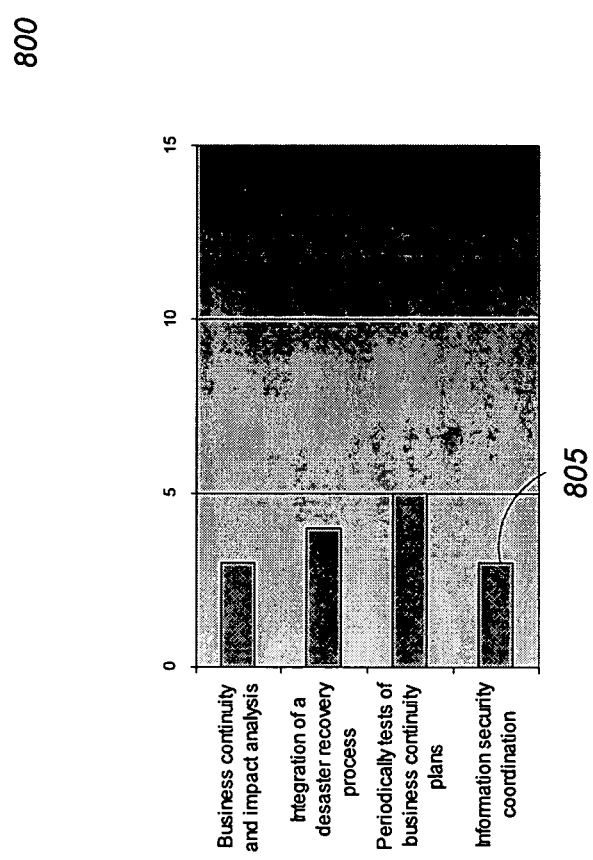

FIG. 8 illustrates a second method of displaying to a computer user the implementation of security measures related to regulatory requirements. In this view, additional information is provided about each measure associated with a particular regulation, and the number of requirements associated with that measure that are likely not fully fulfilled. For example, measure 805 is information security coordination. According to this display, approximately three requirements relating to measure 805 are not likely to have been fulfilled.

Figure 9:
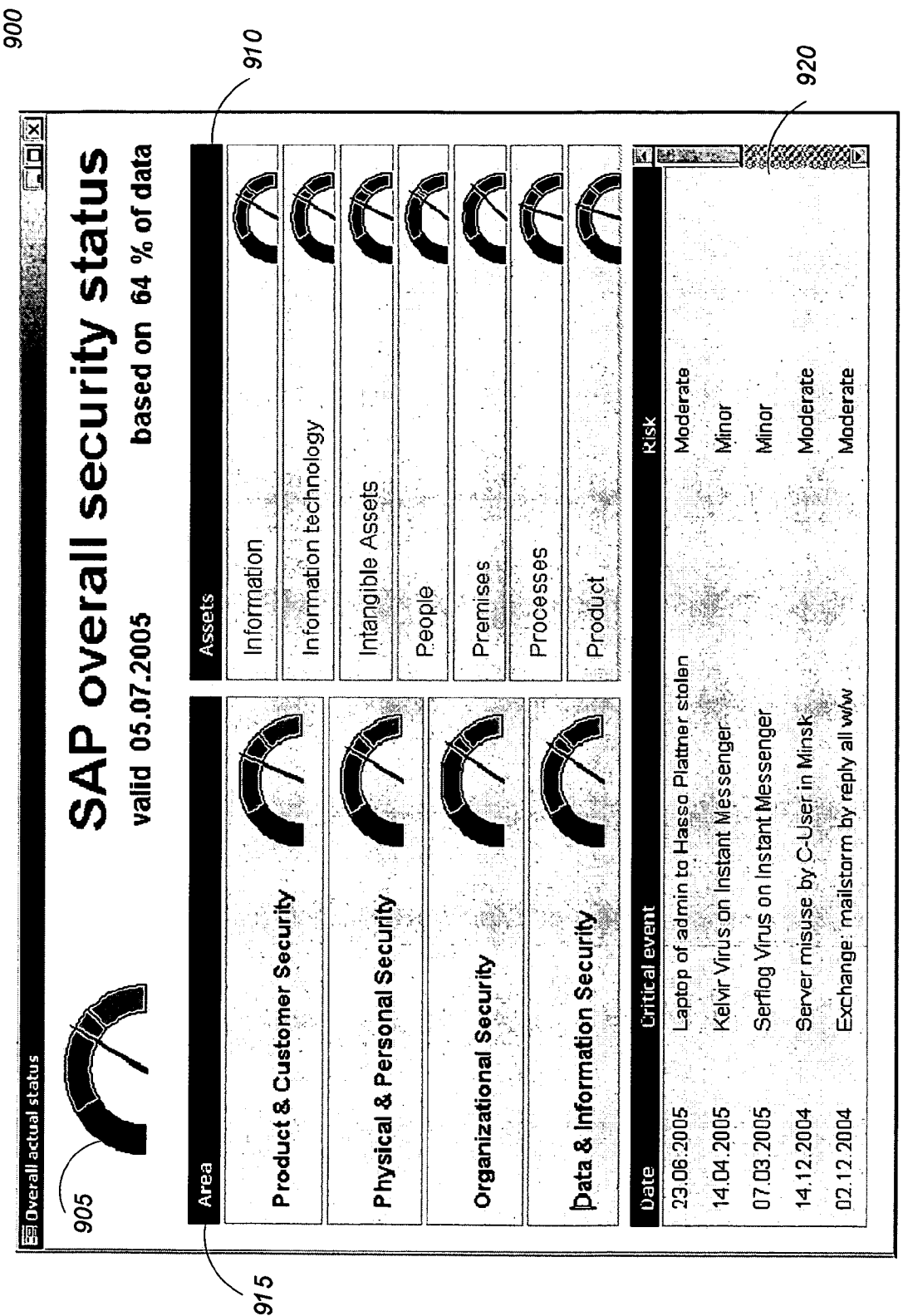

FIG. 9 illustrates a computer-generated display to a computer user of a snapshot view of the organization's security status. The status of various aspects of the organization's security is presented in a speedometer format, with a needle indicating whether a particular metric falls within the red, yellow, or green zone of the traffic light system. The overall security status 905 indicates that the organization falls within the middle, or yellow, level. This indicates that the organization is making progress towards fully implementing adequate measures to protect its assets, but still has a ways to go. However, the speedometer showing the overall security status 905 also shows that the organization is relatively close to the green zone, indicating that as long as progress continues towards implementing the various measures, the organization is close to reaching green status.

In addition, multiple speedometers in the security snapshot indicate the status of security relating to various types of assets 910, as well as the security associated with different divisions 915. Various critical security events 915, as well as the level of risk associated with each security event, are also displayed in the security snapshot.

Figure 10:
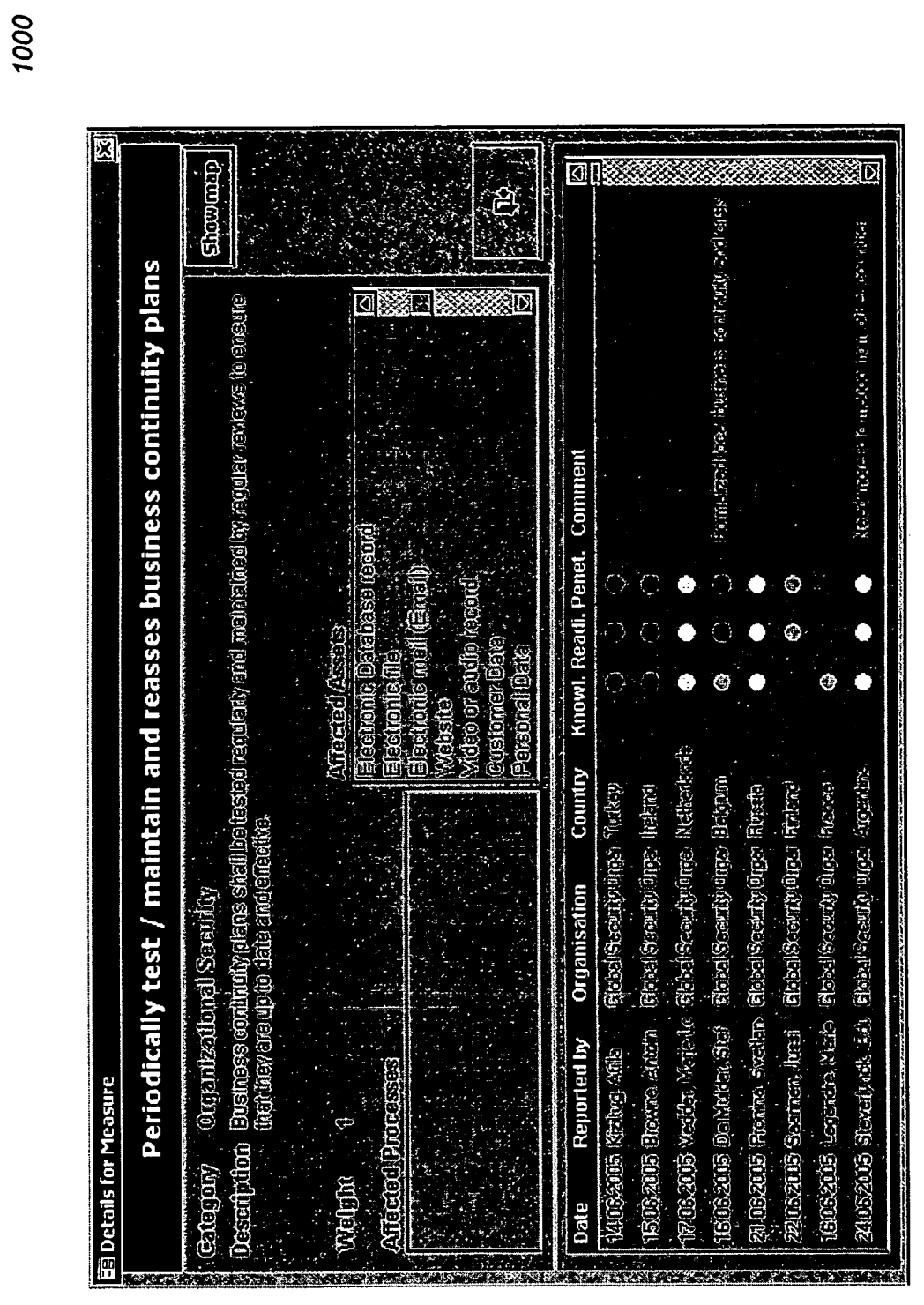

FIG. 10 illustrates a computer-generated display of information providing further details about a particular measure with regards to each country in which the organization has a presence. A description of the measure, assets that are affected by the measure, processes that are affected by the measure, as well as the traffic signal status of each KPI for each country is displayed. Alternatively, this same information can also be displayed in a graphical format overlaid on a map, as shown in FIG. 11.

Figure 11:
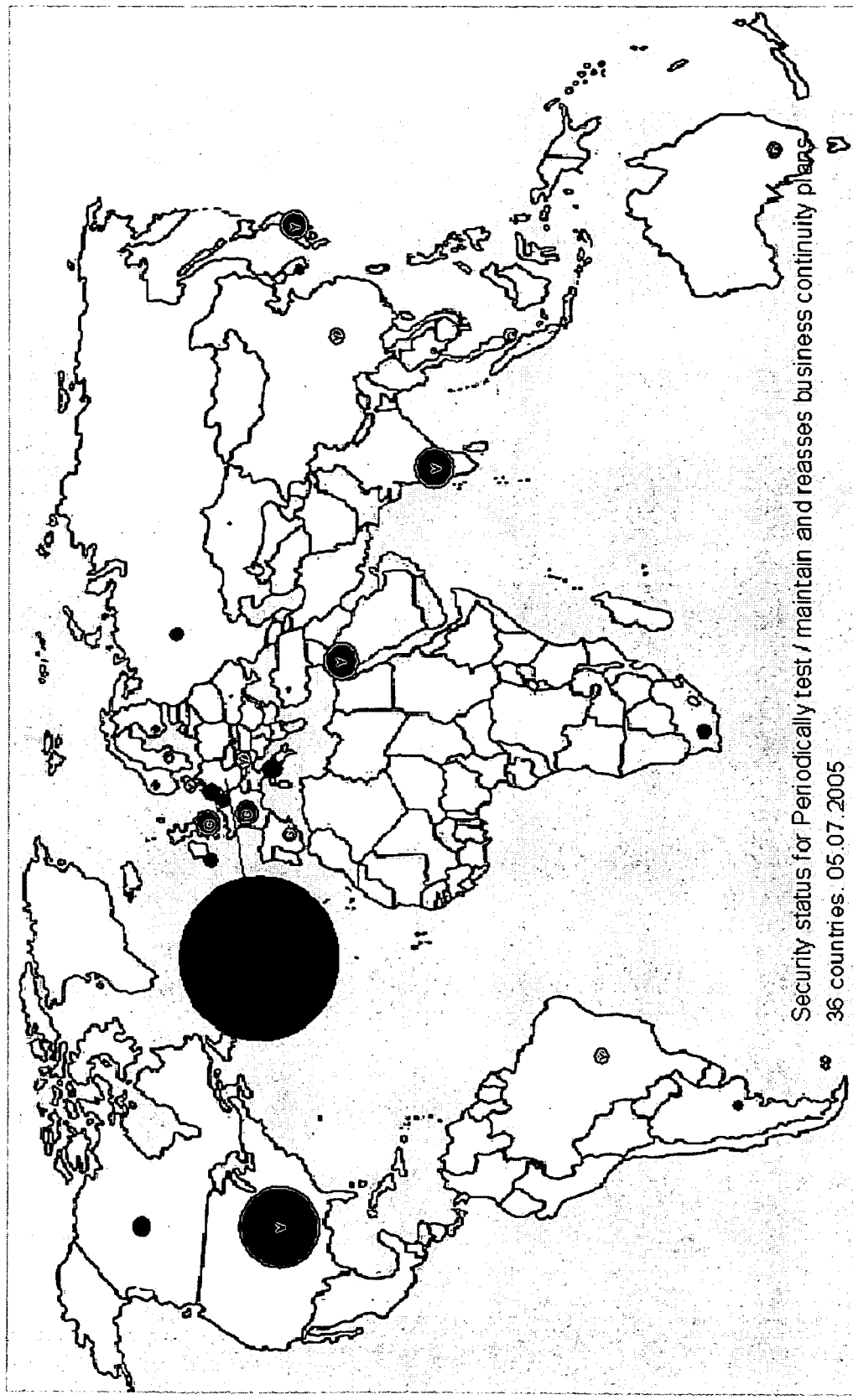

In FIG. 11, the color of the circle indicates the overall status of this measure for a particular country, and the size of the circle indicates the proportion of assets affected by this measure that are allocated to that particular country. For example, although Australia has a green traffic light status with regards to this measure, the size of the circle indicates that only a small proportion of the organization's assets affected by this measure are located in Australia.

Figure 12:
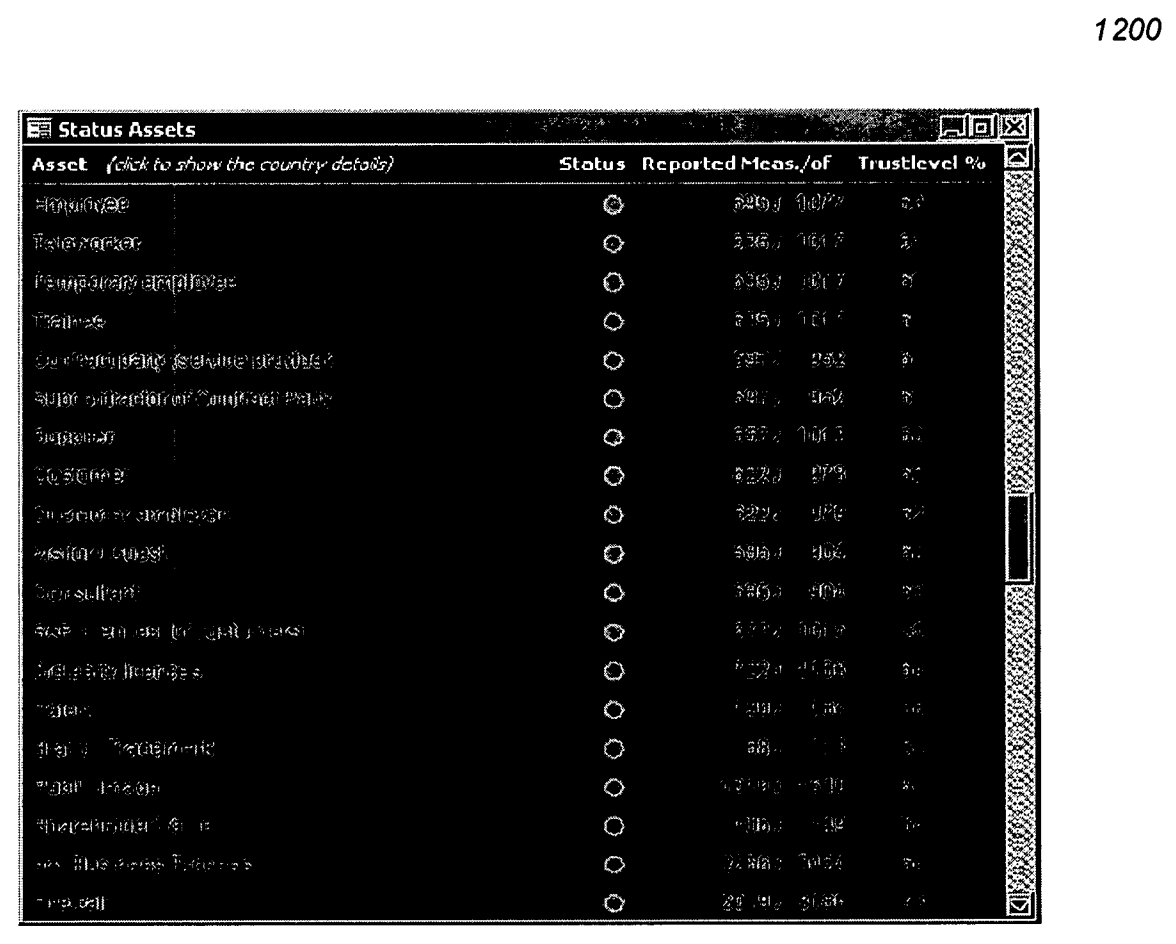

FIG. 12 illustrates a computer-generated display of information detailing the global status of particular assets within the organization. In addition to the traffic light status for each asset, the number of reported measures for a particular asset can be displayed, as well as the total number of measures, either reported or unreported, relating to a particular asset. A confidence, or trust level, for each particular asset status can also be displayed.

Figure 13:
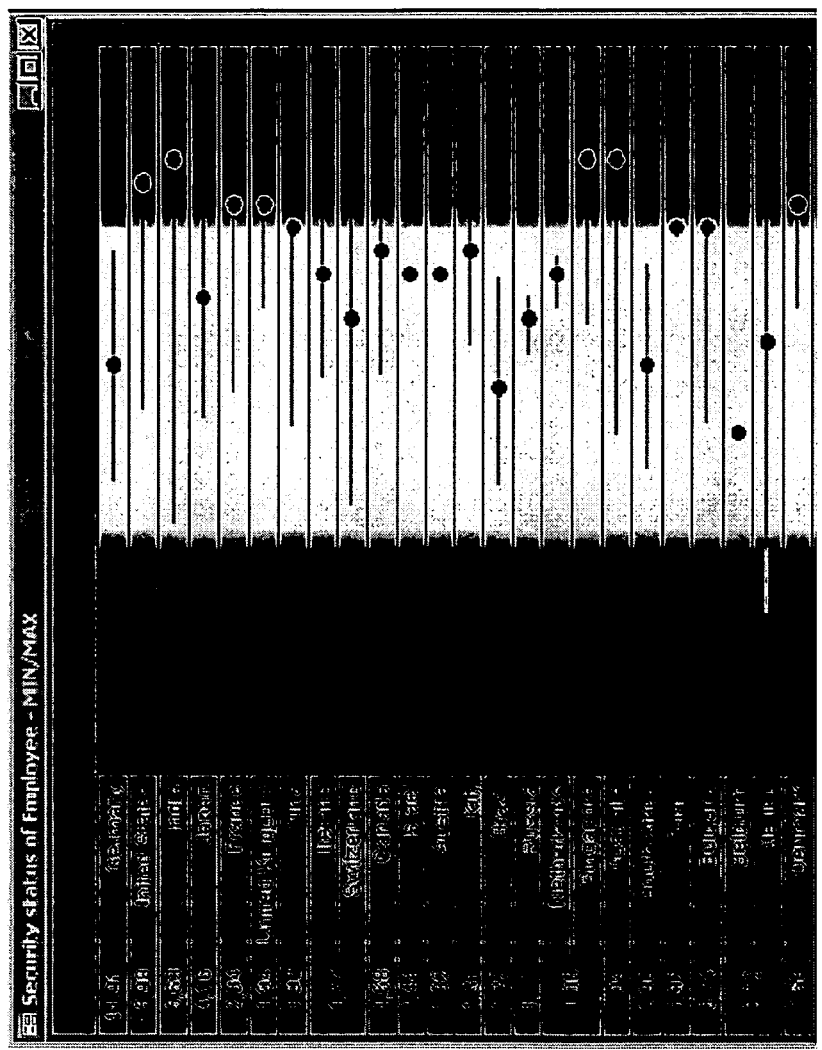

FIG. 13 illustrates a computer-generated display showing further detail about the status of a particular asset; in this instance, the status of the asset is shown for each country. In this view, a confidence band is displayed for the status of the asset in each county. For example, the status of the employee asset in the United States is green, as indicated by the dot falling in the rightmost zone. However, the confidence band extends into the central yellow zone, because not all of the measures relating to the employee asset have been reported, and it is possible that the true status of this asset within the United States is yellow, rather than green. In addition, the number to the left of each country represents the percentage of the total asset that is located in that particular country. This information relating to the status of one or more assets can also be displayed as a map-based graphical format, similar to that shown in FIG. 11.

Figure 14:
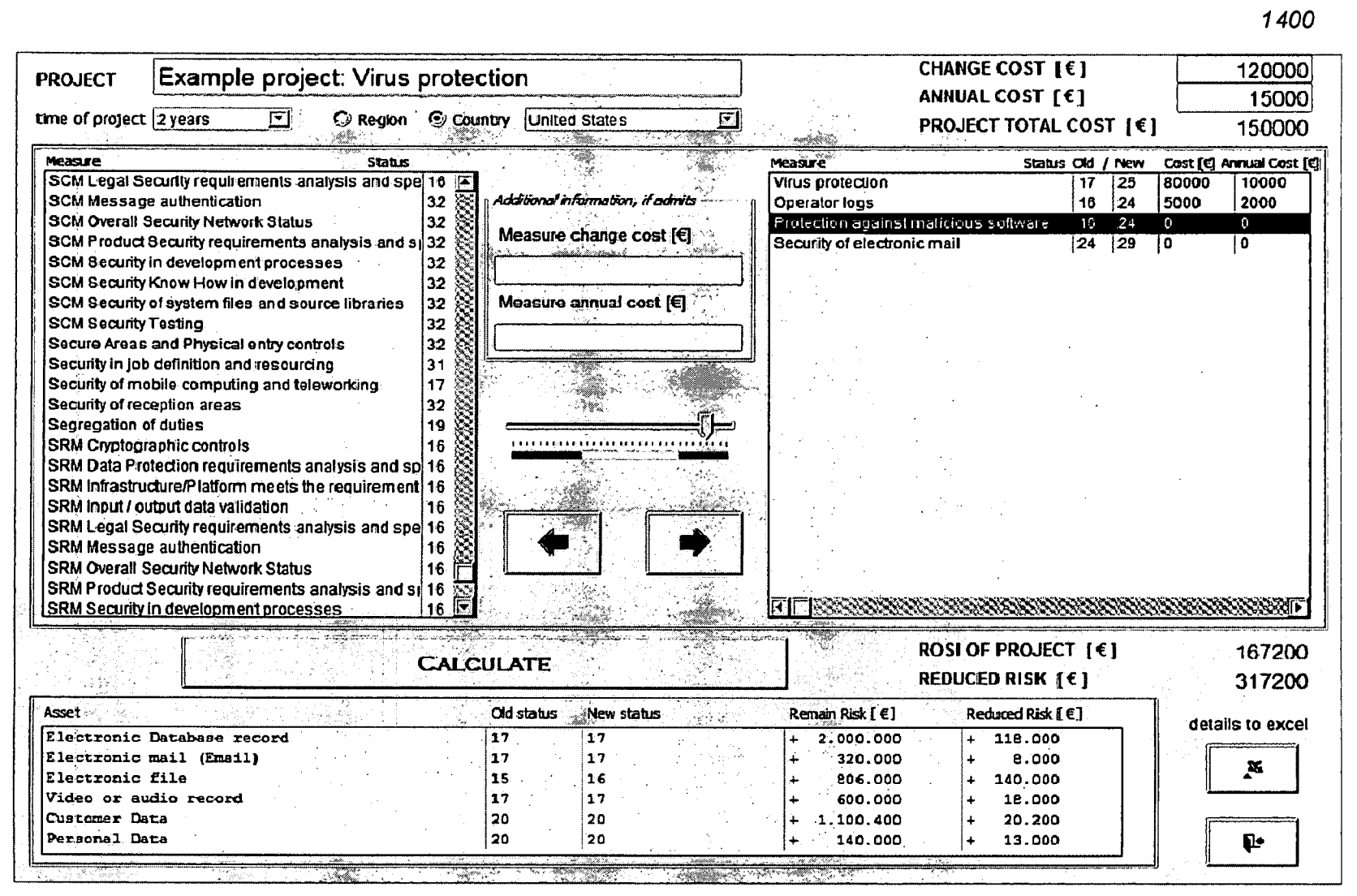

FIG. 14 shows an example of a form 1400 that can be used to run a simulation of a proposed project. This form allows an individual to simulate a project by determining the measures that will be impacted by the proposed project and entering revised values for the status of each of these measures. In addition, if any new measures are implemented due to the proposed project, these can be entered by the individual as well. The user also enters the costs of implementing the proposed project, as well as any annual recurring costs that will be incurred due to the proposed project. The system can then use these entries to simulate the proposed project and calculate a return on investment for a proposed project, as well as the value attributable to the reduced risk to the organization's assets because of this proposed project. This allows decision makers to select projects that will have the best return on investment and greatest impact on the protection of the organization's assets.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. Many of the operations described above can be performed in a different order and still achieve desirable results. In certain implementations, multitasking and parallel processing may be advantageous. Different mathematical formulas can be used to achieve identical or substantially similar results. Different numbers of levels can be used for presentation and acquisition of information. For example, for some organizations or parts of organizations a two-level representation may be sufficient; for others, the use of more than three levels can offer advantages. In addition, this methodology of associating measures with threats and threats to assets can be used for the management of risks that are not related to security issues, such as business risks, financial risks, etc. Other embodiments are within the scope of the following claims.

What is claimed is:

1. A computer program product, tangibly embodied in a tangible machine-readable storage medium, for execution by a processor, the computer program product being operable to cause data processing apparatus to:
   present a questionnaire form on display, the form adapted to collect reporting data from a plurality of users pertaining to a set of measures;
   receive asset data representing a set of assets, the asset data including a respective value for each asset in the set of assets having a value;
   receive threat data representing a set of threats, each threat in the set of threats potentially reducing the value of one or more of the assets in the set of assets;
   receive measures data representing the set of measures, each measure in the set of measures protecting the value of one or more assets such that i) asset data representing one of the assets in the set of assets or ii) measures data representing a measure in the set of measures, is based on reporting data collected from the plurality of users through the questionnaire form;
   automatically calculate a loss expectancy based upon the value of the assets, a potential reduction of value caused by the threats, and a protection of value caused by the measures;
   receive project data representing a simulated project, the simulated project modifying one or more assets, threats, or measures;
   automatically calculate a revised loss expectancy based upon the value of the assets, the potential reduction of value caused by the threats, and the protection of the value caused by the measures as modified by the simulated project;
   automatically calculate a savings caused by the simulated project based upon the loss expectancy and revised loss expectancy; and
   generate a report, the report including at least one of the savings caused by one or more simulated projects.

2. The computer program product of claim 1, the computer program product being further operable to cause data processing apparatus to:
   receive a cost of the simulated project; and
   calculate a return on investment based on the savings and the cost, wherein the report includes the return on investment of one or more simulated projects.

3. The computer program product of claim 2, the computer program product being further operable to cause data processing apparatus to:
   modify a value of asset data representing a first asset in the set of assets, wherein the value is modified in response to reporting data received from a user, the reporting data directed to the first asset.

4. A computer-implemented method comprising the following steps performed by at least one processor:
   presenting a questionnaire form on a display, the form adapted to collect reporting data from a plurality of users pertaining to a set of measures;
   receiving asset data representing a set of assets, the asset data including a respective value for each asset in the set of assets having a value;
   receiving threat data representing the set of measures, each measure in the set of measures protecting the value of one or more assets such that i) asset data, representing one of the assets in the set of assets or ii) measures data representing a measure in the set of measures, is based on reporting data collected from the plurality of users through the questionnaire form;

receiving measures data representing a set of measures, each measure in the set of measures protecting the value of one or more assets;

automatically calculating a loss expectancy based upon the value of the assets, a potential reduction of value caused by the threats, and a protection of value caused by the measures;

receiving project data representing a simulated project, the simulated project modifying one or more assets, threats, or measures;

automatically calculating a revised loss expectancy based upon the value of the assets, the potential reduction of value caused by the threats, and the protection of the value caused by the measures as modified by the simulated project;

automatically calculating a savings caused by the simulated project based upon the loss expectancy and revised loss expectancy; and generating a report, the report including at least one of the savings caused by one or more simulated projects.

5. The method of claim 4, further comprising:

receiving a cost of the simulated project; and calculating a return on investment based on the savings and the cost, wherein the report includes the return on investment of one or more simulated projects.

6. The method of claim 4, wherein the reporting data comprises feedback from users relating to real world implementation of the set of measures.

* * * * *